US012727692B2

(12) United States Patent
Ernst

(10) Patent No.: US 12,727,692 B2
(45) Date of Patent: Sep. 8, 2026

(54) DRINKING SYSTEM WITH INJECTOR PUMP

(71) Applicant: air up group GmbH, Munich (DE)

(72) Inventor: Rudolf Ernst, Hamburg (DE)

(73) Assignee: air up group GmbH, Munich (DE)

( * ) Notice: Subject to any disclaimer, the term of this patent is extended or adjusted under 35 U.S.C. 154(b) by 137 days.

(21) Appl. No.: 18/708,462

(22) PCT Filed: Oct. 13, 2022

(86) PCT No.: PCT/EP2022/078587
§ 371 (c)(1),
(2) Date: Jan. 7, 2025

(87) PCT Pub. No.: WO2023/083557
PCT Pub. Date: May 19, 2023

(65) Prior Publication Data

US 2025/0127317 A1 Apr. 24, 2025

(30) Foreign Application Priority Data

Nov. 10, 2021 (DE) ......................... 102021129285.9

(51) Int. Cl.
*A47G 19/22* (2006.01)
*A47G 21/18* (2006.01)
(Continued)

(52) U.S. Cl.
CPC ....... *A47G 19/2266* (2013.01); *A47G 21/183* (2013.01); *B01F 25/43141* (2022.01); *B01F 33/50111* (2022.01)

(58) Field of Classification Search
CPC .......................... A47G 21/183; A47G 2400/04
See application file for complete search history.

(56) References Cited

U.S. PATENT DOCUMENTS 3,463,361 A * 8/1969 Cook .................. A47G 21/183 222/630
4,308,241 A 12/1981 deVries
(Continued)

FOREIGN PATENT DOCUMENTS

DE 202016004961 U1 * 9/2016 ............. A47G 19/22
DE 10-2022-105794 B3 12/2022
(Continued)

OTHER PUBLICATIONS

International Search Report and Written Opinion dated Feb. 13, 2023, in connection with International Application No. PCT/EP2022/078587, and English translation thereof.

*Primary Examiner* — Allan D Stevens
(74) *Attorney, Agent, or Firm* — Fish & Richardson P.C.

(57) ABSTRACT

A drinking system includes a drinking vessel defining a receiving chamber for a liquid, a drinking straw, a fragrance reservoir which is loaded with fragrance and has an inflow opening for air and an outflow opening for fragrance-enriched air, and an injector pump arrangement which is connected to or integrated into the drinking straw. The injector pump arrangement includes a drive nozzle, an expansion chamber fluidically connected directly downstream of the drive nozzle, and a collector nozzle fluidically connected directly downstream of the expansion chamber.

20 Claims, 10 Drawing Sheets

(51) Int. Cl.

| | |
|---|---|
| ***B01F 25/4314*** | (2022.01) |
| ***B01F 33/501*** | (2022.01) |

(56) References Cited

U.S. PATENT DOCUMENTS

| | | | | |
|---|---|---|---|---|
| 7,100,838 | B1 * | 9/2006 | Epstein | A47G 21/182<br>239/12 |
| 2007/0240582 | A1 | 10/2007 | Eimer et al. | |
| 2012/0012718 | A1 | 1/2012 | Tiso | |
| 2013/0277449 | A1 * | 10/2013 | Alon | A47G 21/183<br>239/33 |
| 2014/0166680 | A1 * | 6/2014 | St. Gelais | A47G 21/183<br>220/710 |
| 2018/0000269 | A1 * | 1/2018 | San Miguel | A47G 21/183 |
| 2020/0178712 | A1 * | 6/2020 | Jäger | B65D 23/12 |
| 2023/0270270 | A1 * | 8/2023 | Jüngst | A47G 21/18<br>220/709 |
| 2024/0164557 | A1 | 5/2024 | Ernst | |
| 2024/0190613 | A1 | 6/2024 | Ernst | |
| 2025/0375051 | A1 | 12/2025 | Ernst | |

FOREIGN PATENT DOCUMENTS

| | | | | |
|---|---|---|---|---|
| EP | 1 746 920 | B1 | 4/2010 | |
| EP | 2 215 936 | A1 | 8/2010 | |
| GB | 2401527 | A * | 11/2004 | A47G 21/183 |
| WO | WO 2019/016096 | A1 | 1/2019 | |

* cited by examiner

DRINKING SYSTEM WITH INJECTOR PUMP

CROSS-REFERENCE TO RELATED APPLICATIONS

This Application is a national stage filing under 35 U.S.C. 371 of International Patent Application Serial No. PCT/EP2022/078587, filed Oct. 13, 2022, which claims priority to German application number 10 2021 129 285.9, filed Nov. 10, 2021, each of which are herein incorporated by reference in their entirety.

The present invention relates to a drinking system having the features of the preamble of claim 1.

Drinking systems are described in the prior art which allow the consumption of water mixed with fragrances introduced into the air, such that the water seems to have a taste different from the taste of pure water due to the sensory phenomenon known as retronasal olfaction, whereby fragrances carried in the air via the mouth and throat are perceived by the sense of smell but interpreted by the brain as taste. Depending on the choice of fragrance, the drinking water seems, for example, to taste of orange, peppermint or similar, although the substance consumed as a drink is still pure drinking water.

Such a drinking system is disclosed, for example, in WO 2019/016096 A1. A drinking system developed by the inventors named in that laid-open document and based on the principles disclosed therein is available on the market under the brand name Air Up®.

A component of this drinking system is a drink container in the form of a drinking bottle into which, starting from a drinking opening at an upper end, a drinking straw projects down to or close to a base located at a lower end of the vessel. In a section located close to the drinking opening, an opening with a smaller diameter than a cross-section of the drinking straw is provided in an outer wall of the drinking straw. Another component of the drinking system is a fragrance reservoir that can be placed on or attached to the drinking container and has an inflow opening and an outflow opening. The fragrance reservoir is loaded with a fragrance that is released into the air flowing through the fragrance reservoir from the inflow opening to the outflow opening. When the fragrance reservoir is arranged on the drinking vessel, the outflow opening is fluidically connected to the opening in the outer wall of the drinking straw. When a user of the drinking system sucks on the drinking straw, thereby triggering a flow of beverage contained in the drinking vessel, namely water, a negative pressure is created at the opening in the outer wall of the drinking straw through which air is sucked in via the fragrance reservoir, the air being loaded with fragrance as it flows through the fragrance reservoir and then reaching the user's mouth and throat together with the sucked-in water where it produces the aforementioned sensory effect through retronasal olfaction, and thus the desired impression of taste which is determined by the type of fragrance.

Although the known drinking system works in principle, it has problems and disadvantages that result in a drinking sensation or drinking experience that users perceive as unpleasant when using the known drinking system. Users describe the drinking sensation when using the well-known Air Up® bottle as "bubbly" or "as if you were drinking through a straw with a hole in it."

This effect, observable when using the Air Up® drinking system, is due to the following causes:

In the known drinking systems of the Air Up® brand, the opening (suction opening) in the outer wall of the drinking straw provided for sucking in the fragrance-laden air is located approximately 220 mm above the lower end of the drinking straw projecting into the drinking vessel. When the bottle is almost completely empty, for example with a remaining fill level of approximately 10 mm, a negative pressure is created at the suction opening by the 210 mm water column. This corresponds to a pressure of around 2.1 hPa.

With the Air Up® drinking system, if the drinking vessel (drinking bottle) is filled to the indicated maximum fill level, this results in a fill level 150 mm above the inflow opening at the lower end of the drinking straw, and a corresponding counter-pressure occurs in the drinking straw. In this case, the negative pressure of the water column occurring at the position of the suction opening for sucking in the fragrance-laden air is reduced to around 680 hPa.

This amounts to a difference of around 310% between the negative pressure occurring at the suction opening for the fragrance-laden air at the minimum and maximum fill levels of the drinking bottle of the Air Up® drinking system, relative to the minimum value. This is a very high figure.

The effect of the static negative pressure occurring at the suction opening of the Air Up® drinking system is also shown by the fact that a user who tries to drink liquid from the drinking bottle by sucking on the drinking straw without a fragrance reservoir attached to the drinking bottle can only suck in air through the suction opening, but not liquid from the drinking bottle. This is due to the static negative pressure that occurs at the suction opening, as explained above. This is so great that it cannot be overcome by the suction exerted by a user drinking normally.

The designers of the Air Up® drinking system have solved this problem by ensuring that the inflow and outflow openings of the fragrance reservoir each have a very small diameter of between 0.5 and 1 mm. The outflow opening of the fragrance reservoir consequently has a diameter that corresponds to the suction opening in the drinking straw. In this system, the fragrance reservoir thus represents a throttle that causes a pressure drop in the flow of fragrance-laden air. This pressure drop in the throttle compensates for most of the static negative pressure at the suction opening, thereby establishing a state of equilibrium which determines the ratio in which fragrance-laden air and water sucked in from the drinking vessel are mixed.

However, as the static negative pressure in the drinking straw fluctuates greatly with the change in fill level, the mixing ratio of air and water changes the more the bottle is emptied. The system is therefore unstable.

In its current design, the Air Up® drinking system addresses this problem by tapering the cross-section of the drinking straw starting from the lower end where the liquid to be drunk is sucked in up to the suction opening for the fragrance-laden air. The cross-section of the drinking straw then remains constant over the rest of its length of approx. 18 mm, i.e. from the suction opening as far as the upper end of the drinking straw from which the user drinks. With the Air Up® drinking system, the reduction in cross-section from the lower opening of the drinking straw to the section where the suction opening is located is approximately 65%. The cross-section of the drinking straw is therefore reduced to around a third of its original size. This reduction in cross-section causes a reciprocal, i.e. threefold, increase in the flow velocity. This increase in the flow velocity creates a dynamic negative pressure in the liquid to be drunk, which is added to the static negative pressure occurring at the suction opening.

Assuming a flow velocity of 10 meters per second in the tapered end of the drinking straw and a constant drinking rate, a dynamic negative pressure of around 450 hPa is developed when the cross-section is reduced by ⅔. This dynamic negative pressure is relevant in relation to the static negative pressure that occurs in the drinking straw at the suction opening for the fragrance-laden air.

When the drinking bottle is filled to the maximum, the dynamic negative pressure in the drinking straw of the Air Up® drinking system is around 65%, or around ⅔, of the minimum static negative pressure in the drinking straw at the suction opening. With a minimally filled drinking bottle, however, this value is around 25%, or ¼, of the static negative pressure occurring at the suction opening in the drinking straw.

Unlike the static negative pressure, the dynamic negative pressure is constant when drinking uniformly, which means that the negative pressure occurring at the inflow point of the fragranced air fluctuates less strongly, that is to say, not by the aforesaid amount of approximately 310% for a drinking straw with a constant cross-sectional area, but only by 220%, in each case relative to the minimum value.

However, when a user consumes liquid it does not flow through the drinking straw at a constant rate. Rather, at the beginning of the drinking process it rises from zero to a maximum value and at the end of the drinking process falls from the maximum value back to zero. The flow velocity also fluctuates between two sips by the user. This being so, the tapering of the cross-section of the drinking straw also contributes to the instability of the known drinking system.

Admittedly, the tapering of the cross-section makes up for the significant change in the static pressure conditions that gradually occurs as the bottle is emptied by overriding the dynamic negative pressure, thereby leading to a relatively small change. However, the dynamic pressure and thus the pressure conditions in the drinking straw at the suction opening are overlaid by pulsations caused by transient processes and irregularities in the flow velocity.

In addition to the influence of the pressure conditions described above, the drinking experience of the Air Up® drinking system is also affected by another phenomenon, which the present inventor refers to as the “soap bubble effect”. This is because bubbles whose diameter is considerably greater than the diameter of the inflow point can form in the flow of water provided with fragranced air at the suction opening. The size of the air bubbles at this point depends on the flow velocity and the surface tension at the interface between water and air. In fact, the Air Up® drinking system produces very large air bubbles at this point, which can even fill the entire cross-section of the drinking straw.

The air bubbles, which in particular are irregular in terms of their size and expansion, also lead to further instability in the system due to fluctuations in the average density of the water column caused by the air bubbles above the suction opening and thus the static negative pressure occurring.

Based on the prior art described above and the highlighted problems, it is the object of the present invention to improve a drinking system of the type mentioned at the outset, in particular so as to obtain a more stable and pleasant drinking experience.

This object is solved by a drinking system having the features of claim 1. Advantageous further embodiments are described in the dependent claims 2 to 12.

A drinking system according to the invention firstly includes a drinking vessel. This drinking vessel comprises a receiving chamber for a liquid. The drinking system also includes a drinking straw arranged on the drinking vessel and inserted into the receiving chamber. The drinking straw has a first end at which it has an inlet opening. This first end of the drinking straw projects towards the bottom of the receiving chamber. The drinking straw also has a second end at which it has a drinking opening. The drinking straw projects from the drinking vessel in the region of the second end. A suction channel is formed in the drinking straw between the inlet opening and the outlet opening.

The drinking system further includes a fragrance reservoir loaded with fragrance having an inflow opening for air and an outflow opening for fragrance-enriched air. The drinking straw of the drinking system is connected or connectable to the outflow opening in order to suck in fragrance-enriched air emerging from the outflow opening of the fragrance reservoir.

While the drinking system according to the invention still has the same features as the previously known drinking system, the particular feature of the drinking system according to the invention is that it has an injector pump arrangement which is connected to or integrated into the drinking straw. The injector pump arrangement has a main flow path surrounded by an outer wall, which is connected to the suction channel or is a component of the suction channel. Furthermore, the injector pump arrangement has a suction opening which is led through the outer wall and is fluidically connected or connectable to the outflow opening of the fragrance reservoir.

The injector pump arrangement provided according to the invention has at any rate the following components integrated into the main flow path in a direction pointing towards the second end of the drinking straw:

- a drive nozzle,
- an expansion chamber which is fluidically connected directly downstream of the drive nozzle, and
- a collector nozzle which is fluidically connected directly downstream of the expansion chamber.

The suction opening leads into the expansion chamber of the injector pump arrangement.

According to the invention, the fragrance-enriched air flowing from the fragrance reservoir is therefore not sucked in through a simple hole in the drinking straw, as in the prior art. Rather, this is achieved by the injector pump arrangement, which works like a water jet pump and consists of a drive nozzle, an expansion chamber and a collector nozzle.

When suction is applied to the second end of the drinking straw, liquid, typically water, is sucked into the receiving chamber and passes through the drive nozzle into the expansion chamber where, due to the resulting negative pressure, fragrance-enriched air is sucked in from the fragrance reservoir via the suction opening. This fragrance-enriched air flows into the expansion chamber at this point and is entrained by the liquid flow. The expansion chamber adjoins the collector nozzle which directs the liquid flow into or inside the suction channel of the drinking straw. This collector nozzle helps to stabilize the pressure conditions in the drinking straw and thus improves the drinking sensation.

A conical intake funnel tapering towards the drive nozzle can be placed fluidically upstream of the drive nozzle. The effect of such an intake funnel is that the drive nozzle simultaneously acts as a throttle in the liquid flow, thereby creating a constant resistance that overrides the pressure drop generated by the inflow of fragrance-enriched air through the suction opening, thus producing a more uniform and therefore improved drinking sensation for the user.

The intake funnel can preferably be very short with a steep taper angle. In particular, the intake funnel can have a length that is 50% to 150% of the diameter of an inflow opening located at an inflow end. The diameter of this inflow opening can advantageously be 2.5 to 4 times as large as the diameter of the drive nozzle, in particular 3 to 3.5 times as large, for example approximately 3 times as large.

With such a design, the aforementioned effect of the intake funnel is particularly good.

The drinking system according to the invention can furthermore include a mixing chamber which is fluidically connected, in particular directly, downstream of the collector nozzle and which has a larger diameter than the suction channel adjoining this mixing chamber. In such an embodiment, the mixture generated in the aforementioned injector pump arrangement from the liquid removed from the receiving chamber and the fragrance-enriched air is swirled in a mixing chamber, the flow being separated on entering the mixing chamber and converted from a laminar to a turbulent flow. Swirling in the mixing chamber causes the large air bubbles formed by the air sucked in through the suction opening to form smaller air bubbles, which are present in correspondingly larger numbers and evenly distributed in the liquid flow. This also improves the drinking sensation when using the drinking system according to the invention.

In particular, the mixing chamber can be tapered conically towards the second end of the drinking straw, in particular with a taper angle of 3 to 15 degrees. The length of the mixing chamber can be between 5 and 10 times the diameter of the collector nozzle. With such a design, the mixing chamber has proven to be particularly effective in terms of breaking up and finely distributing the air bubbles emerging from the suction opening.

In order to mix the sucked-in fragrance-laden air and the sucked-in liquid, typically water, another device can optionally be provided alternatively or additionally, namely a static mixer. Such a static mixer is formed by an insert integrated into the drinking straw, or more precisely into the flow channel formed within it, or such a fitting, or a structure incorporated into it in the form of an interrupted helix. Such a structure also converts a laminar flow into a turbulent flow and thus boosts the aforementioned effect of reducing the size of the air bubbles entrained by the liquid and homogeneously distributing them in the liquid flow.

In principle, the injector pump arrangement according to the invention can be provided at any point along the length of the drinking straw. Advantageously, it can be arranged at the first end of the drinking straw, preferably including an optionally provided mixing chamber. The advantage of such an arrangement is that static positive pressure occurs in the expansion chamber rather than static negative pressure, as is the case with the design of the Air Up® system known from the prior art at the location of the suction opening provided in the outer wall of the drinking straw. If the injector pump arrangement is positioned as suggested at the first end of the drinking straw, it easily overcomes the static overpressure occurring in the expansion chamber.

When the injector pump arrangement is placed at the first end of the drinking straw, it is advantageous to arrange a non-return valve between the suction opening of the injector pump arrangement and the outflow opening of the fragrance reservoir, for example in the air pipe connecting these two openings, thereby allowing the fragrance-enriched air to flow only towards the suction opening. This prevents liquid from reaching and penetrating into the fragrance reservoir through the suction opening. Such a non-return valve can advantageously be configured as a mushroom valve, in particular made of silicone. Such a mushroom valve opens due to the fact that an edge of a mushroom disk of the valve is stretched in the peripheral direction and lifted up.

The advantage of a solution as described above is a particularly stable and pleasant drinking experience with very small bubbles being formed that mix very well in the drinking straw. However, at the start of the drinking process, the drinking straw including the injector pump arrangement must first be emptied, i.e. the volume must first be drunk by the user of the drinking system without fragrance-enriched air being supplied, so that the taste experience is delayed.

Further advantages and features of a drinking system according to the invention are given in the following description of possible embodiments on the basis of the attached figures. These show the following:

FIG. 1 A schematic representation of a possible embodiment of a drinking system according to the invention.

FIG. 2 A schematic representation of an alternative possible embodiment of a drinking system according to the invention.

FIG. 3 A schematic and enlarged representation of an injector pump arrangement of a drinking system according to the invention with an intake funnel connected upstream and a mixing chamber connected downstream.

FIG. 4 A schematic representation of a further possible embodiment of a drinking system according to the invention.

FIGS. 5A and 5B show representations that enlarge the portion labeled V in FIG. 4 to illustrate the valve arranged there, once in the closed position (FIG. 5A) and once in the open position (FIG. 5B).

FIG. 6 The drinking system shown in FIG. 4 viewed from above.

The figures show schematic representations of various possible embodiments of the invention. These representations are not necessarily true to scale or true to detail. Rather, they serve to illustrate and explain the principle of the invention in more detail and show the key elements of the invention.

Figure 1:
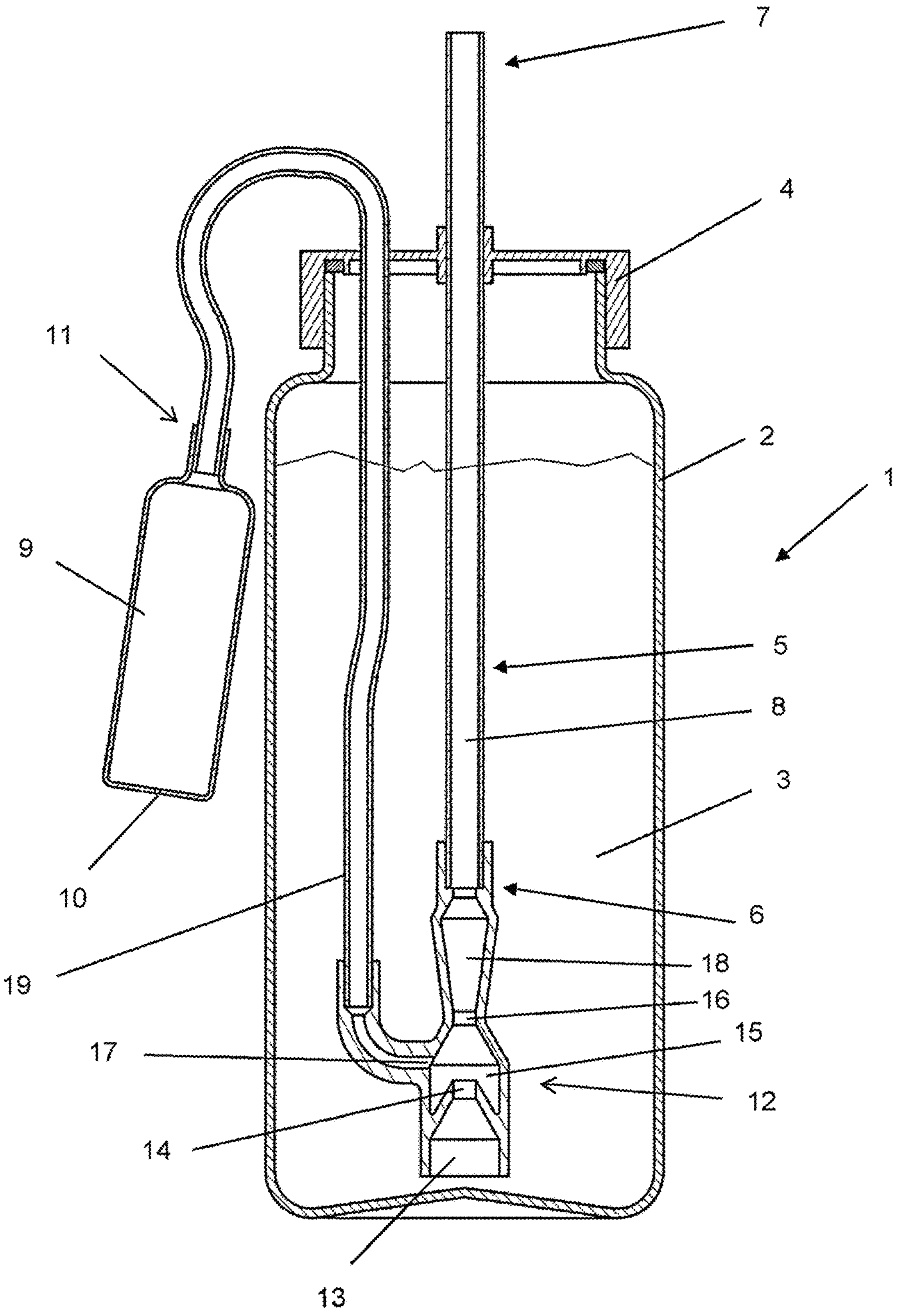
Figure 2:
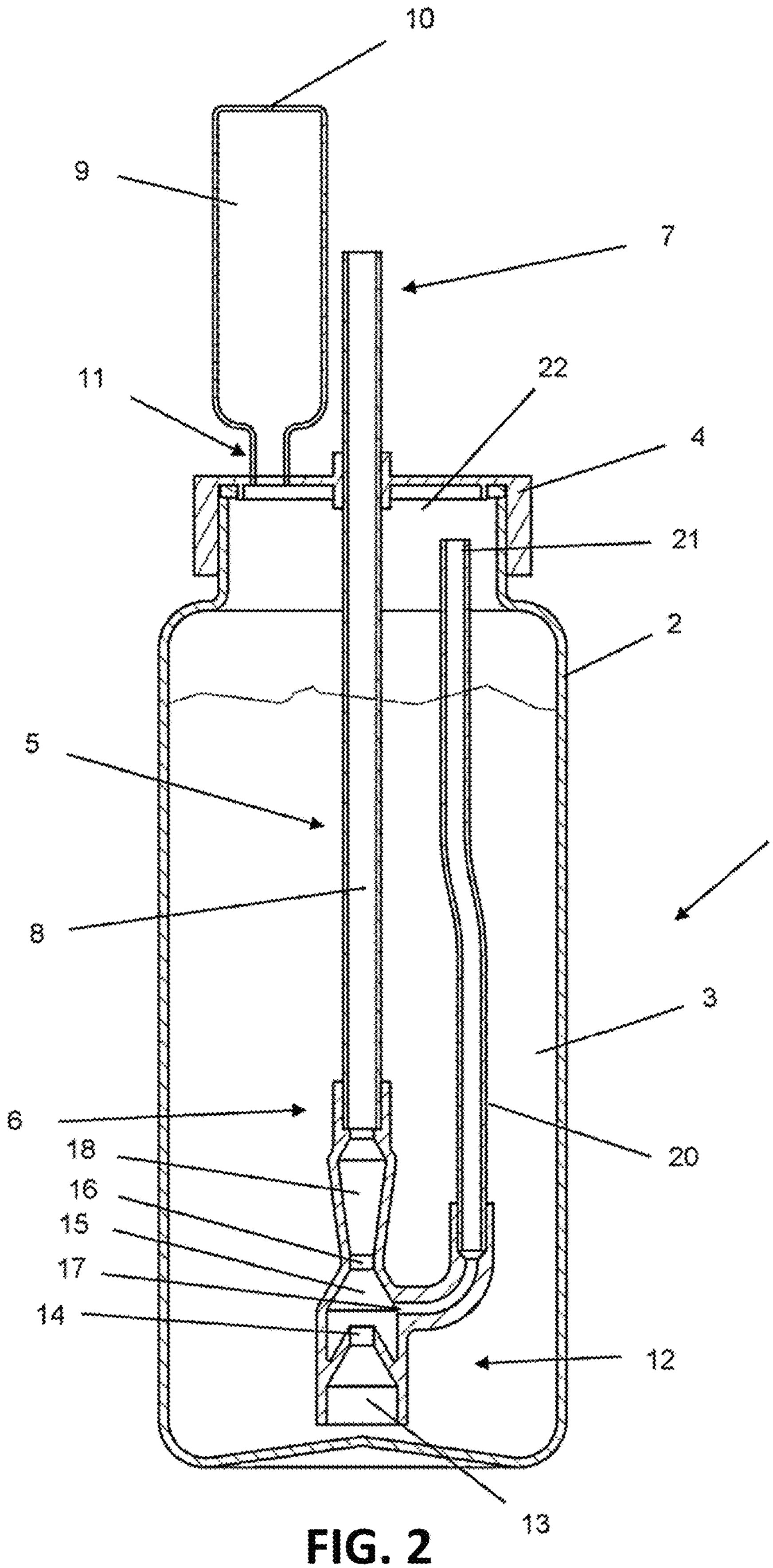

FIGS. 1 and 2 first show two possible embodiments of a drinking system 1 (FIG. 1) and 1' (FIG. 2) according to the invention. These two embodiments are largely constructed in the same way and can therefore be described together in the following. The respective drinking system 1, 1' comprises a drinking vessel in the form of a drinking bottle 2. The drinking bottle 2 encloses a receiving chamber 3 which can hold a liquid, typically water or drinking water, indicated in FIG. 1 by a slightly wavy filling level line. The drinking bottle 2 is closed at an upper end with a lid 4.

Into the receiving chamber 3 there extends a drinking straw 5, a first end 6 of which projects towards a base of the receiving chamber 3, thus towards a base of the drinking bottle 2, and a second end 7 of which projects from the drinking bottle 2 through the lid 4. Between the two ends 6, 7 of the drinking straw, a suction channel 8 is formed.

A further component of the drinking system 1 is a fragrance reservoir 9 which is formed by a container in which a fragrance is stored. The fragrance reservoir 9 has an inflow opening 10 and an outflow opening 11.

An injector pump arrangement 12 can also be seen, which in the embodiment shown in FIG. 1 is arranged near the base of the drinking bottle 2 at the first end of the drinking straw 5. This injector pump arrangement has a drive nozzle 14 which is connected to an intake funnel 13 on the inflow side. This has an enlarged inlet opening that tapers conically down to the narrowed diameter of the drive nozzle 14. The inlet opening of the intake funnel 13 has a diameter that is approximately three times as large as the diameter of the drive nozzle 14.

The drive nozzle 14 adjoins an expansion chamber 15 which in turn tapers conically towards a collector nozzle 16 with a reduced diameter. The collector nozzle 16 adjoins a mixing chamber 18 which widens conically in a first portion and narrows again conically in a second portion to a diameter that corresponds approximately to the inside diameter of the suction channel 8 in the drinking straw 5. The taper angle of the mixing chamber 18 can in particular be between 3° and 15°. The length of the mixing chamber 18 can in particular be between 5 and 10 times the diameter of the collector nozzle 16.

A suction opening 17 is formed in the wall of the injector pump arrangement 12 in the region of the expansion chamber 15. The suction opening 17 is fluidically connected to the outflow opening 11 of the fragrance reservoir 9. In the drinking system 1 shown in FIG. 1, this is realized via an air pipe 19 which is directly connected to the outflow opening 11 of the fragrance reservoir 9. In the drinking system 1' shown in FIG. 2, on the other hand, an air pipe 20 is connected to the suction opening 17 and ends with a free end 21 in a head space 22 of the drinking bottle 2. The outflow opening 11 of the fragrance reservoir 9 also leads into this head space 22, resulting in a fluidic connection that can also be understood as indirect.

However, the two variants shown in FIGS. 1 and 2 have the essential structure and effect of the injector pump arrangement 12 in common:

When a user of the drinking system 1 or drinking system 1' sucks on the second end 7 of the drinking straw 5, the negative pressure generated in this way ensures that liquid, typically water, in the receiving chamber 3 inside the drinking bottle 2 is sucked in through the intake funnel 13. The liquid is then led through the drive nozzle 14 and at this point accelerated due to the tapering cross-section. The liquid accelerated in this way then enters the expansion chamber 15 in which the accelerated liquid jet creates a negative pressure. This negative pressure acts on the suction opening 17 so that air is sucked in through it, flowing from the fragrance reservoir 9 and enriched accordingly with fragrance contained therein. This air is entrained by the liquid flowing through the expansion chamber 15 and flows together with the liquid through the collector nozzle 16 and into the mixing chamber 18 arranged thereafter, where the flow of liquid first widens and then narrows again to approximately the cross-section of the suction channel 8 of the drinking straw 5 into which the liquid loaded with fragranced air then passes. During this passage through the mixing chamber 18, the liquid is finely mixed with the air. Starting with a small number of larger air bubbles, many such small bubbles are formed in the liquid.

The arrangement according to the invention significantly improves the drinking sensation for a user of the drinking device 1 or 1' compared to the known prior art. This is attributable to various aspects. For example, the intake funnel 13 causes the drive nozzle 14 not only to accelerate the flow of incoming liquid and thereby generate a negative pressure at the suction opening 17. Due to the intake funnel 13, the drive nozzle 14 also acts as a throttle in the liquid flow and thus creates a constant resistance that overrides the pressure drop caused by the inflow of air sucked in from the fragrance reservoir 9 and subjectively provides for a more uniform and thus improved drinking sensation. The collector nozzle 16 arranged at the end of the expansion chamber 15 also helps to stabilize the pressure conditions in the drinking straw 5 and thus also improves the drinking sensation.

The mixing chamber 18, which reduces the size of the air bubbles entrained with the liquid flow and provides intensive and uniform mixing of the air bubbles with the liquid in the manner described above, also helps to improve the drinking sensation.

Figure 3:
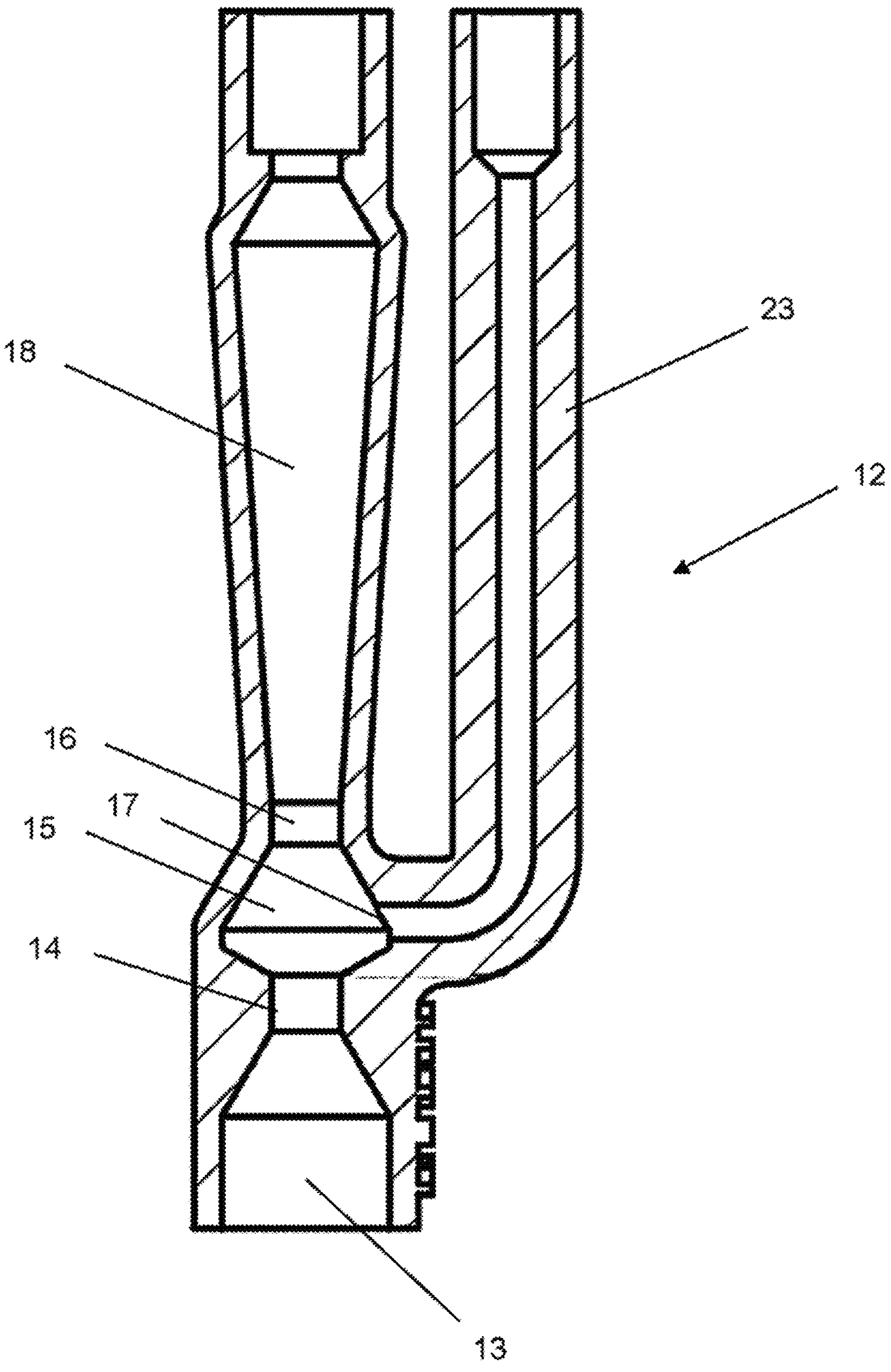
Figure 4:
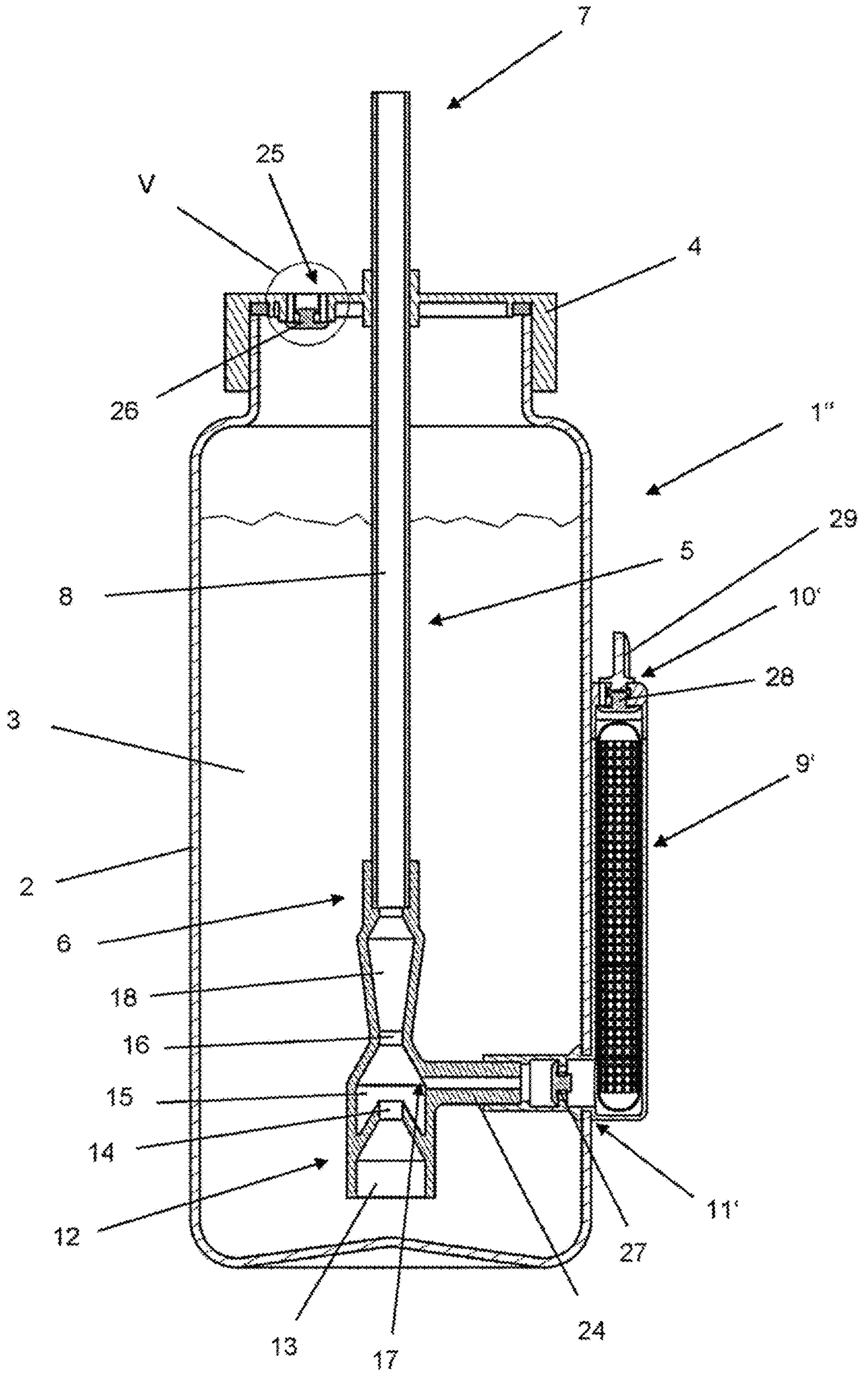

FIG. 3 shows an enlarged view of a possible embodiment of an injector pump arrangement 12 with an intake funnel 13 connected upstream and a mixing chamber 18 connected downstream. The aforementioned components of the injector pump arrangement 12 can be seen. Furthermore, a permanently molded-on pipe connection piece 23 can be seen, which leads into the suction opening 17 and to which, for example, one of the air pipes 19 or 20 can be connected.

FIGS. 4 to 7B show a further possible embodiment of a drinking system 1". This is largely identical in design, or at any rate analogous, to the drinking systems 1 and 1' shown in FIGS. 1 and 2. Reference can therefore be made to the above description. The following explanations relate mainly to the deviating designs and features.

The drinking system 1", too, has an injector pump arrangement 12 as a central component together with the individual components described above. The injector pump arrangement 12 of the drinking system 1" also works according to the principle described above. However, in the injector pump arrangement 12 of the drinking system 1", the suction opening 17 is connected to the outflow opening 11' of the fragrance reservoir 9' via a pipe section 24 designed with a short flow path, which is in particular significantly shorter than the flow paths in the drinking systems 1 and 1', thus largely without an air pipe 19 or 20 arranged in between, as provided in the embodiments of the drinking systems 1 and 1'. To achieve this, the fragrance reservoir 9' has, in particular, a different shape and is arranged directly on the side wall of the drinking bottle 2. For this purpose, the fragrance reservoir 9' can, for example, be permanently attached to the side wall and equipped, via an inspection opening not shown in detail here, with a cartridge or similar component carrying the actual fragrance or aromatic substance. This cartridge or similar component can then be replaced or refilled with a new fragrance once the fragrance is exhausted.

The fact that the pipe section 24 is now significantly shorter in the drinking system 1" compared to the air pipes 19 and 20 in the drinking systems 1 and 1' results in a significantly smaller dead volume, so that, upon drinking, the fragrance is supplied to the drinker with the consumed liquid more directly and without any delay.

Figure 5A:
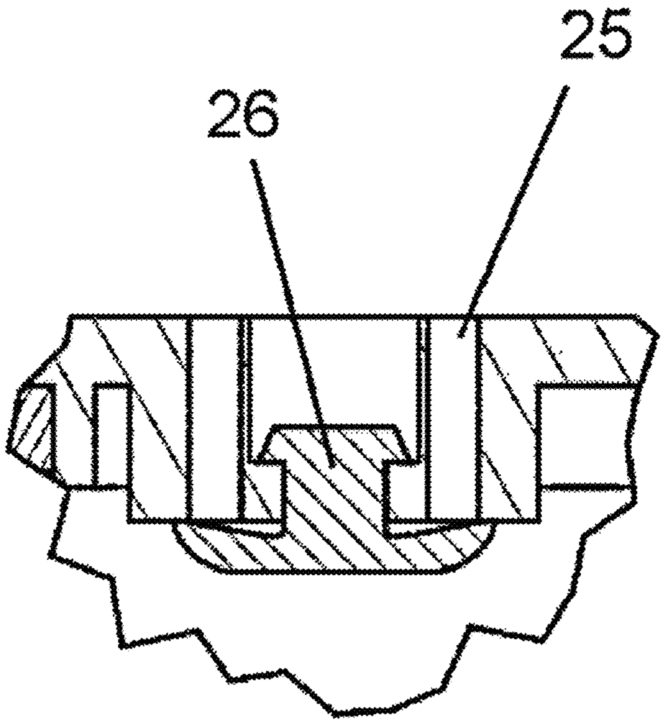
Figure 5B:
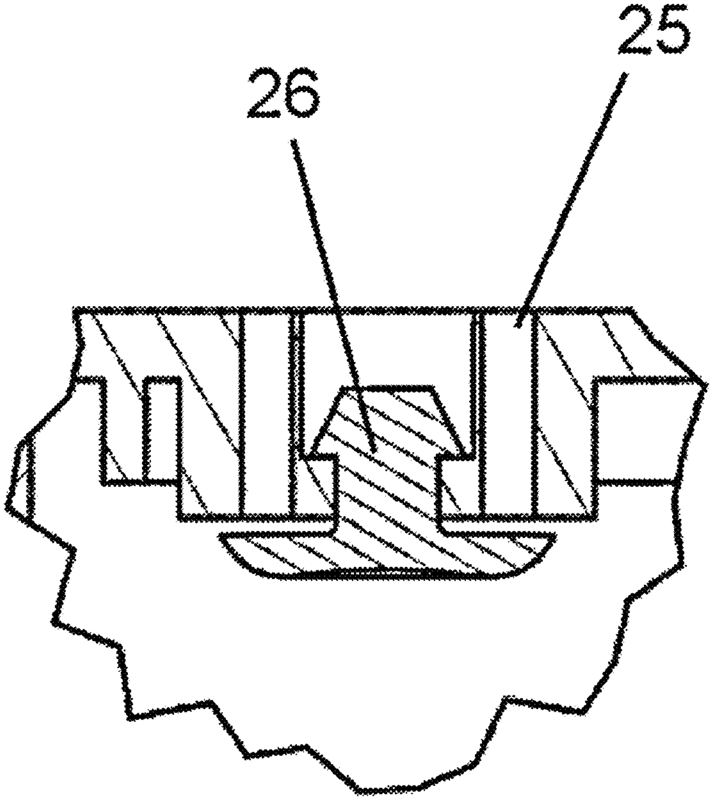
Figure 6:
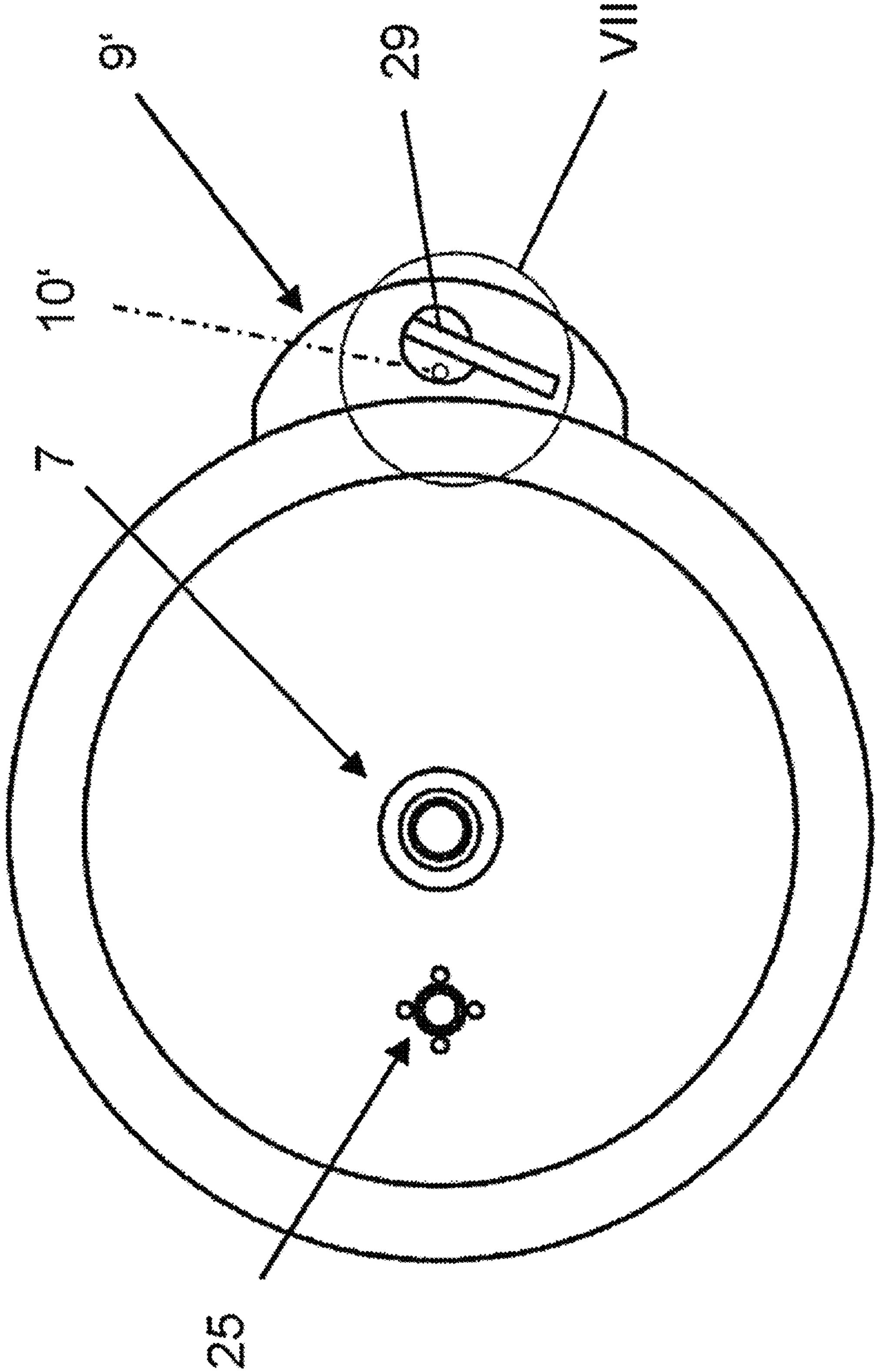
Figure 7A:
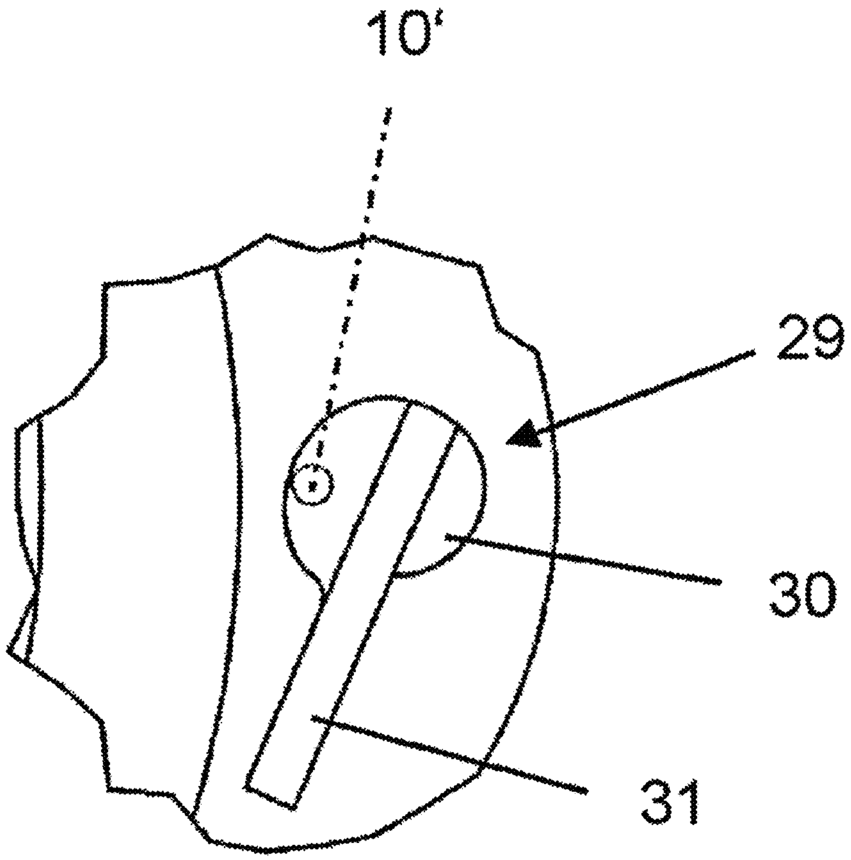
FIGS. 7A and 7B show representations that enlarge the portion labeled VII in FIG. 6 to illustrate the inflow opening provided there and the associated air volume regulator in two different positions.
Figure 7B:
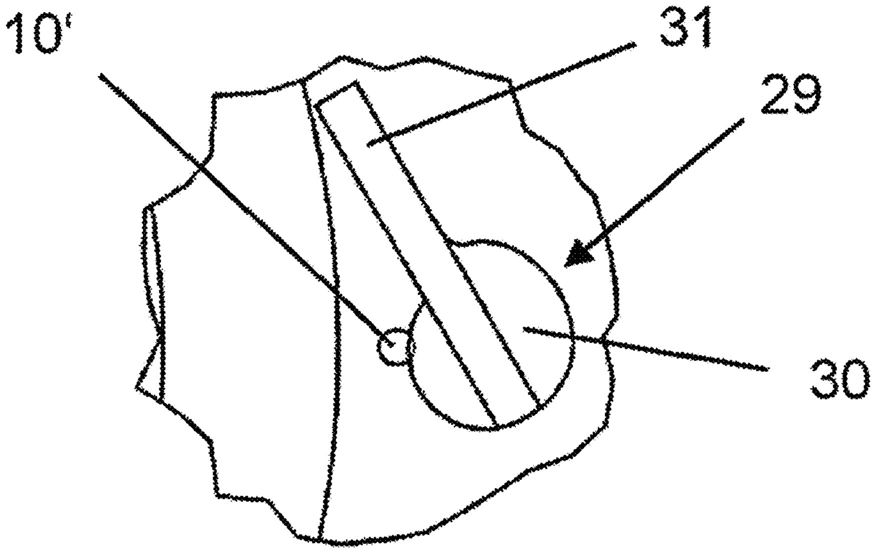
Figure 8:
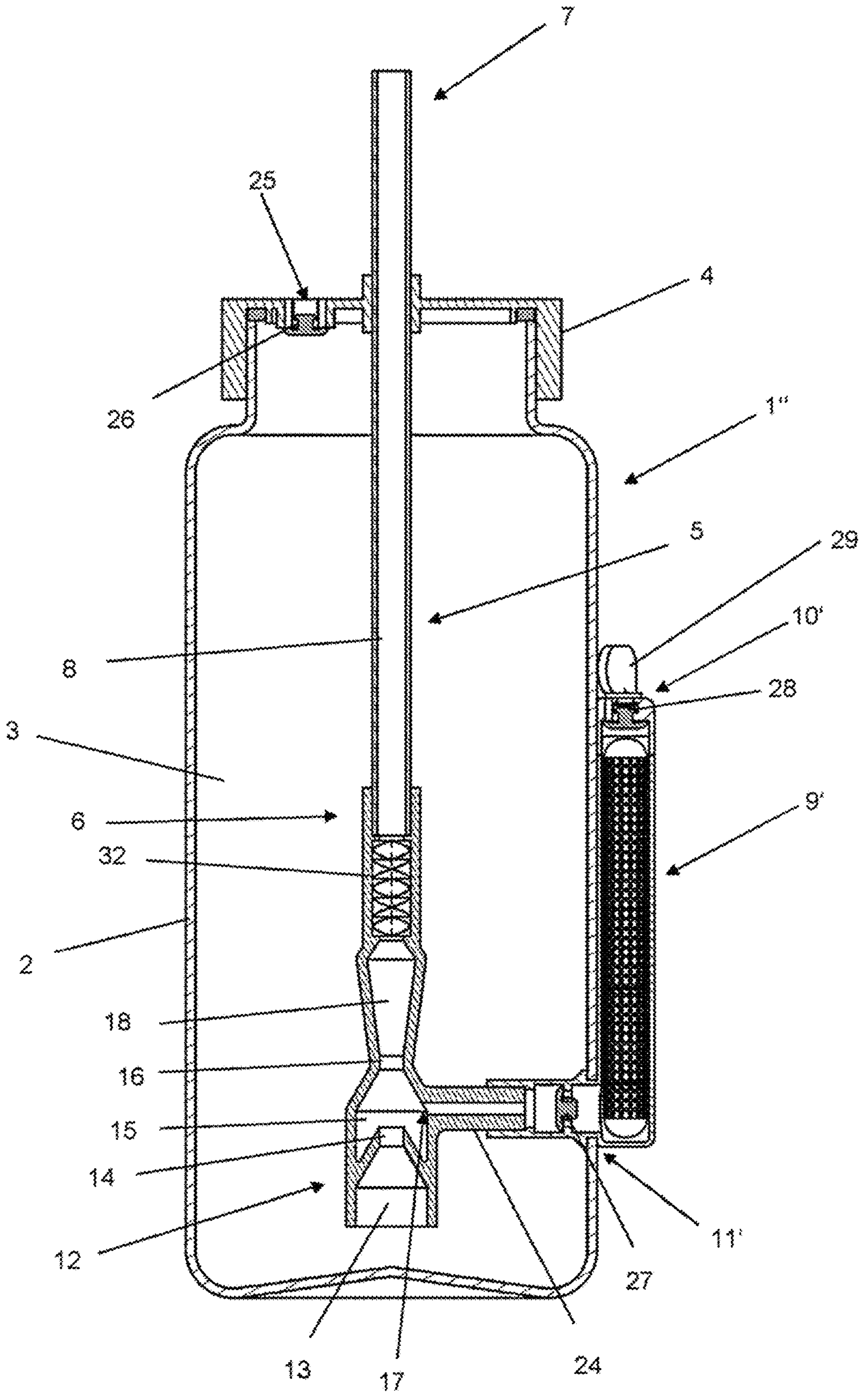
FIG. 8 shows a representation of a further embodiment similar to FIG. 4, modified compared to the embodiment shown in FIG. 4 by the addition of a static mixer.

Furthermore, the drinking system 1" is provided with various valves to prevent backflow and to ensure the flow of air when drinking. For example, a ventilation opening 25 is provided in the lid 4 of the drinking bottle 2 of the drinking system 1" through which air can be fed into the receiving chamber 3 of the drinking bottle 2 when a negative pressure is created there. This ventilation opening 25 is closed by a valve 26 which may, for example, be in the form of a so-called mushroom valve, as shown in the enlarged representation in FIGS. 5A and 5B. The valve body of the valve 26 is made from an elastic material, e.g. silicone or another plastic, and in the normal state is in a closed position as shown in FIG. 5A, in which it closes the ventilation opening 25. If a certain negative pressure now exists in the receiving chamber 3, as occurs when the user sucks on the drinking straw 5, the valve body of the valve 26 is drawn into the receiving chamber and is deformed in such a way that it opens the ventilation opening 25, allowing air to flow into the receiving chamber 3.

A similar valve 27 is arranged at the outflow opening 11' of the fragrance reservoir 9'. This opens when a negative pressure exists in the pipe section 24 due to the effect described earlier in connection with the explanation of the injector pump arrangement 12 also used here, so that air can flow through the fragrance reservoir 9' and absorb and entrain fragrance. On the other hand, the valve 27 serves as a non-return valve, closes when there is overpressure in the pipe section 24 or when there is negative pressure in the fragrance reservoir 9' compared to the pipe section 24, and thus prevents liquid from penetrating from the receiving chamber 3 into the fragrance reservoir 9'.

A further valve 28 is finally arranged in the region of the inflow opening 10' of the fragrance reservoir 9'. This normally closes this inflow opening 10' and can therefore also prevent volatile fragrance from escaping from the fragrance reservoir 9' through the inflow opening 10', especially if the drinking system 1" is not used for a prolonged period. If, due to the effects described above, a negative pressure is generated at the suction opening 17 by a user sucking on the second end 7 of the drinking straw 5, this negative pressure also affects the fragrance reservoir 9', thereby opening the valve 28.

A further special feature which is realized in the drinking system 1", but which—like the embodiment with one or more of the valves 26, 27 and 28—can also be implemented in otherwise differently designed drinking systems, such as the drinking systems 1 and 1', is an air volume regulator 29 which is provided in the region of the inflow opening 10'. This air volume regulator is formed by a disk 30 rotatably mounted on the fragrance reservoir 9', on which a lever 31 is arranged for rotating the disk 30. The disk extends from an axis of rotation of varying width and with varying diameter, in this case with a continuously decreasing diameter. The dimensions of the disk 30 are chosen and the disk 30 is arranged in such a way that, in a suitable rotational position, in areas with large diameter it completely covers the inflow opening 10' and, in a different rotational position with areas with smaller diameter, it partially or completely exposes the inflow opening 10'. Thus, not only can the air inlet opening 10' be closed and opened with the air volume regulator 29, but an opening cross-section and thus the inflowing air volume can also be regulated. This can be used in particular to regulate the amount of fragrance entrained in the flow of liquid sucked in at the second end 7 of the drinking straw 5 and thus to influence and determine the intensity of the fragrance experience or of the taste experience produced by retronasal olfaction.

Besides the fact that such an air volume regulator 29 can also be used in connection with other embodiments of the drinking system, other constructive designs can also be chosen here, for example in the form of slides or similar devices that cover the inflow opening with varying overlap.

Finally, FIGS. 8 and 9A-9C show a further embodiment of a drinking system 1" according to the invention. This corresponds in its essential design features to the embodiment described above with reference to FIGS. 4 to 7B, therefore reference can be made to the above description of these figures, which also applies accordingly to the variant shown in FIGS. 8 and 9A-9C.

Figure 9A:
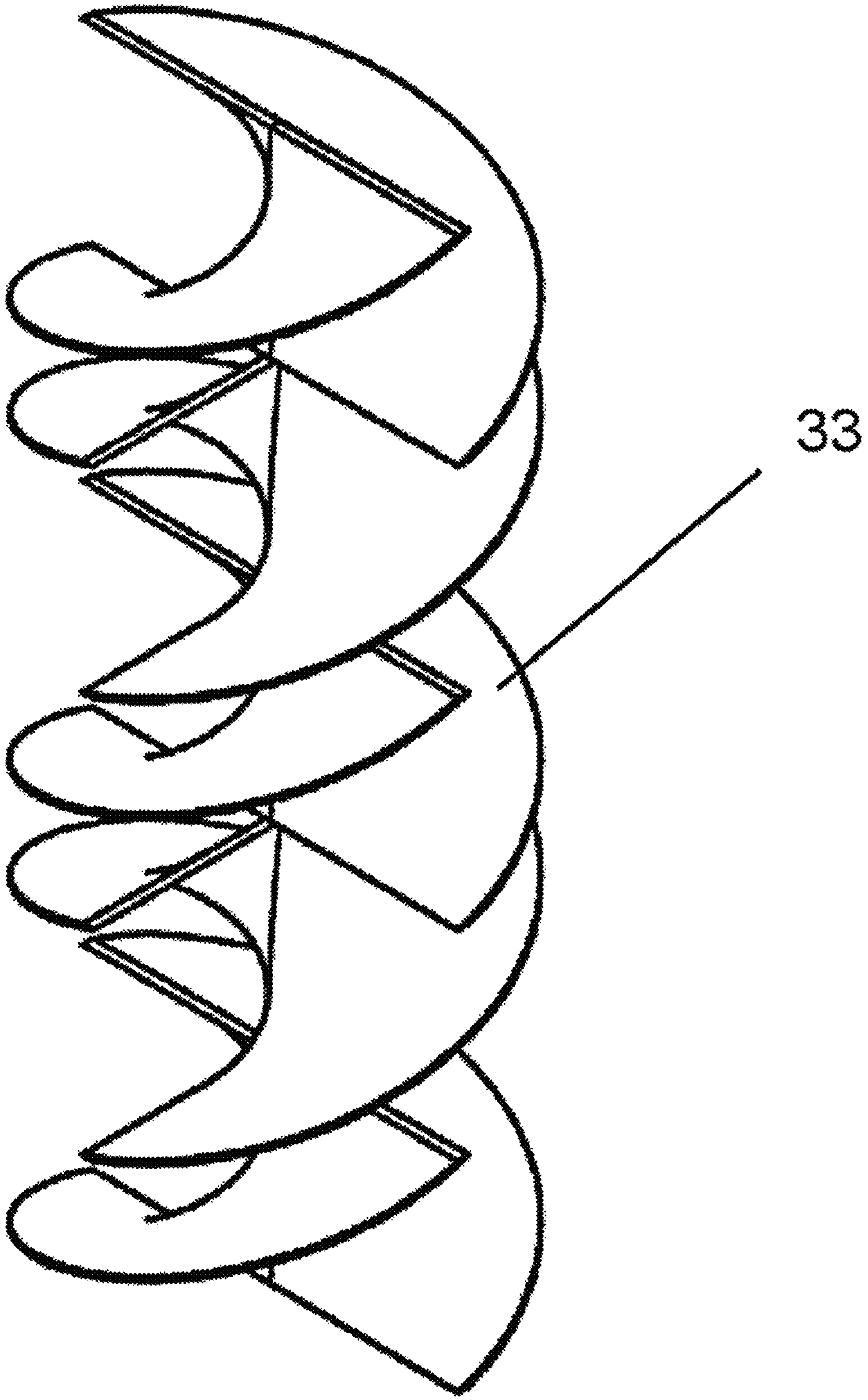
FIGS. 9A-9C show representations of an enlarged view of the insert in the form of an interrupted helix used in the static mixer.
Figure 9B:
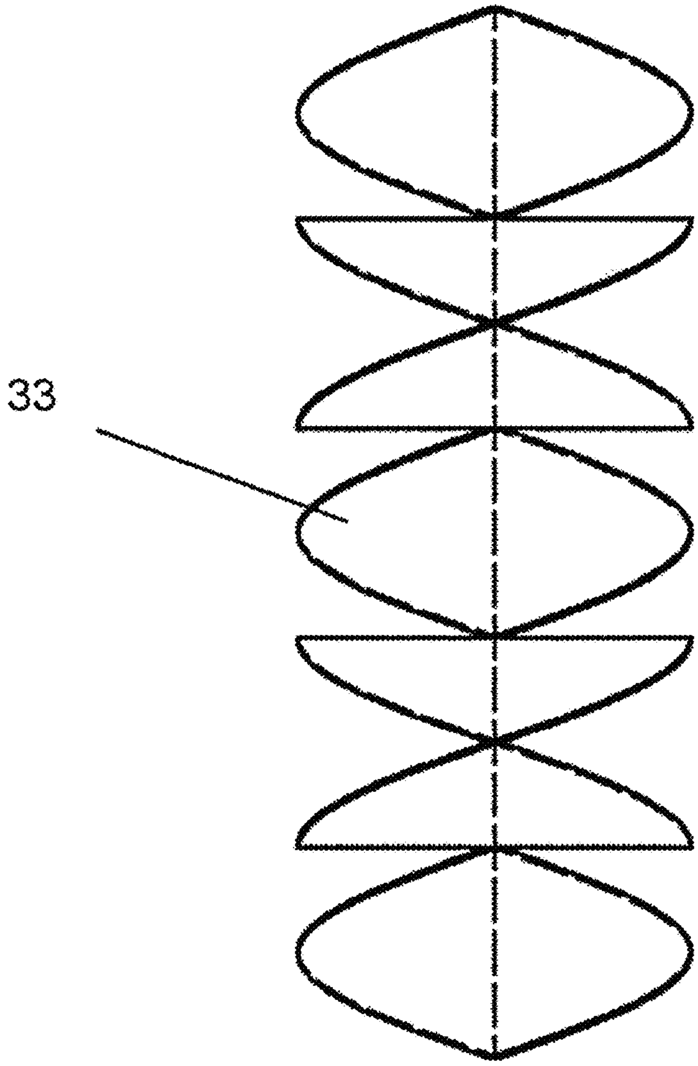
Figure 9C:
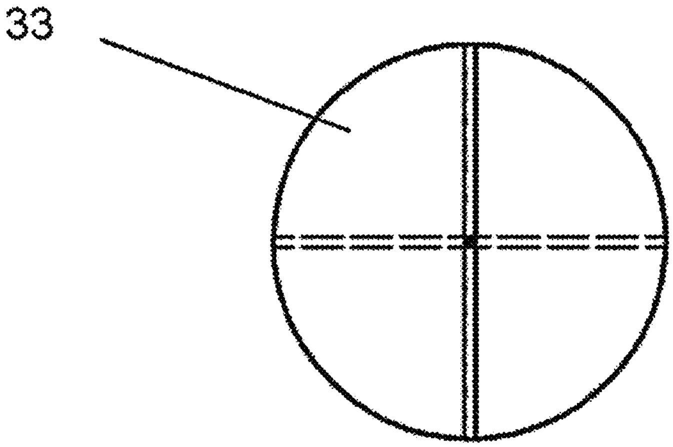

The embodiment shown in FIGS. 8 and 9A-9C differs in that, in addition to the mixing chamber 18, it now includes a static mixer 32 which is integrated into the flow channel or suction channel of the drinking straw or is connected directly to it. This static mixer 32 is an insert placed in the flow channel or a fitting incorporated into it having the form of an interrupted helical baffle 33, as shown in more detail in FIGS. 9A-9C in three views: a three-dimensional view (FIG. 9A), a side view (FIG. 9B) and a view from above, i.e. in the direction of the longitudinal extension of the flow channel with the baffle 33 inserted (FIG. 9C). This mixer 32 is referred to as "static" because it has no moving parts. A laminar flow entering this static mixer is converted into a turbulent flow by the helical segments of the baffle 33 so that, in this mixer 32, larger air bubbles entrained in the liquid flow and picked up via the injector pump arrangement 12 are separated into a greater number of smaller air bubbles, and these air bubbles are homogeneously mixed with the liquid flow. Although the static mixer 32 is shown here as an additional element to the mixing chamber 18 and arranged downstream of the latter, it can also be used instead of the mixing chamber 18 or in an arrangement upstream of the mixing chamber 18.

In the embodiments shown in FIGS. 1, 2, 4 and 8, the injector pump arrangement 12 is shown in each case arranged at the first end 6 of the drinking straw 5 and as an independent part. However, the injector pump arrangement 12 can also be arranged in a different position with respect to the drinking straw 5, in particular near its second end 7, or it can be integrated into the drinking straw at any position. The optionally provided mixing chamber 18 can also be integrated at a position remote from the injector pump arrangement 12. The only essential point is that a possible mixing chamber 18 is arranged fluidically downstream of the expansion chamber 15 or downstream of the collector nozzle 16.

The embodiments described above and shown in the figures are merely to be understood as possible examples. The person skilled in the art will think of other designs that also satisfy the principle of this invention and benefit from its advantages.

LIST OF REFERENCE NUMBERS

1, 1', 1" Drinking system
2 Drinking bottle
3 Receiving chamber
4 Lid
5 Drinking straw
6 First end
7 Second end
8 Suction channel
9, 9' Fragrance reservoir
10, 10' Inflow opening
11, 11' Outflow opening
12 Injector pump arrangement
13 Intake funnel
14 Drive nozzle
15 Expansion chamber
16 Collector nozzle
17 Suction opening
18 Mixing chamber
19 Air pipe

20 Air pipe
21 Free end
22 Head space
23 Pipe connection piece
24 Pipe section
25 Ventilation opening
26 Valve
27 Valve
28 Valve
29 Air volume regulator
30 Disk
31 Lever
32 Static mixer
33 Helical baffle

The invention claimed is:

1. A drinking system comprising:

a drinking vessel defining a receiving chamber for a liquid, a drinking straw arranged in the drinking vessel and guided into the receiving chamber, with a first end having an inlet opening which projects towards a base of the receiving chamber and with a second end with a drinking opening, and with the drinking straw projecting from the drinking vessel and having a suction channel between the inlet opening and the outlet opening, a fragrance reservoir which is loaded with fragrance and has an inflow opening for air and an outflow opening for fragrance-enriched air, the drinking straw being connected or connectable to the outflow opening of the fragrance reservoir in order to suck in fragrance-enriched air emerging from the outflow opening, and an injector pump arrangement which is connected to or integrated into the drinking straw and is joined to the suction channel by a main flow path surrounded by an outer wall or is a component of the suction channel, and which has a suction opening which is led through the outer wall and is fluidically connected or connectable to the outflow opening of the fragrance reservoir, the injector pump arrangement having the following components integrated into the main flow path in a direction pointing towards the second end of the drinking straw:

a drive nozzle, an expansion chamber fluidically connected directly downstream of the drive nozzle, and a collector nozzle fluidically connected directly downstream of the expansion chamber, wherein the suction opening leads into the expansion chamber.

2. The drinking system according to claim 1, wherein the injector pump arrangement has an intake funnel which is fluidically connected upstream of the drive nozzle and tapers conically towards the drive nozzle.

3. The drinking system according to claim 2, wherein, at an inflow opening located at an inflow end, the intake funnel has a diameter that is 2.5 to 4 times as large as a diameter of the drive nozzle.

4. The drinking system according to claim 3, wherein the intake funnel has an axial longitudinal extension, taken in the direction of the suction channel, of 50% to 150% of the diameter of the inflow opening.

5. The drinking system according to claim 2, wherein, at an inflow opening located at an inflow end, the intake funnel has a diameter that is 3 to 3.5 times as large as a diameter of the drive nozzle.

6. The drinking system according to claim 2, further comprising a static mixer provided in the suction channel or connected thereto in the same longitudinal extension, with a baffle element having an interrupted helical shape arranged or formed therein.

7. The drinking system according to claim 2, further comprising a mixing chamber which is fluidically connected downstream of the collector nozzle and which has a larger diameter than the suction channel adjoining it.

8. The drinking system according to claim 7, wherein the mixing chamber is tapered conically towards the second end of the drinking straw.

9. The drinking system according to claim 8, wherein the mixing chamber tapers conically with a taper angle of 3° to 15°.

10. The drinking system according to claim 8, wherein the mixing chamber has an axial longitudinal extension, taken in the direction of the suction channel, of between 5 and 10 times a diameter of the collector nozzle.

11. The drinking system according to claim 1, further comprising a mixing chamber which is fluidically connected downstream of the collector nozzle and which has a larger diameter than the suction channel adjoining it.

12. The drinking system according to claim 11, wherein the mixing chamber is tapered conically towards the second end of the drinking straw.

13. The drinking system according to claim 12, wherein the mixing chamber tapers conically with a taper angle of 3° to 15°.

14. The drinking system according to claim 12, wherein the mixing chamber has an axial longitudinal extension, taken in the direction of the suction channel, of between 5 and 10 times a diameter of the collector nozzle.

15. The drinking system according to claim 11, wherein the mixing chamber is fluidically connected directly downstream of the collector nozzle.

16. The drinking system according to claim 1, further comprising a static mixer connected to the suction channel in the same longitudinal extension, with a baffle element having an interrupted helical shape arranged or formed therein.

17. The drinking system according to claim 1, wherein the injector pump arrangement is arranged in a region of the first end of the drinking straw.

18. The drinking system according to claim 17, further comprising a non-return valve arranged between the suction opening of the injector pump arrangement and the outflow opening of the fragrance reservoir, thereby allowing the fragrance-enriched air to flow only towards the suction opening.

19. The drinking system according to claim 18, wherein the non-return valve is a mushroom valve.

20. The drinking system according to claim 19, wherein the non-return valve is made of silicone.

* * * * *